United States Patent [19]

Mickley

[11] 3,961,035

[45] June 1, 1976

[54] PROCESS FOR PREPARING HYDROGEN SULFIDE

[75] Inventor: Harold S. Mickley, Westport, Conn.

[73] Assignee: Stauffer Chemical Company, Westport, Conn.

[22] Filed: Mar. 27, 1974

[21] Appl. No.: 455,462

[52] U.S. Cl............................ 423/563; 423/416; 423/564; 423/572
[51] Int. Cl.²........................................ C01B 17/16
[58] Field of Search............. 423/563, 571 A, 564, 423/572 A, 416, 437, 242, 565

[56] References Cited

UNITED STATES PATENTS

| | | | |
|---|---|---|---|
| 1,351,755 | 9/1920 | Ikeda | 423/564 |
| 2,474,066 | 6/1949 | Preisman | 423/564 |
| 2,965,455 | 12/1960 | Maude | 423/564 |
| 2,980,523 | 4/1961 | Dille | 423/650 |
| 3,058,800 | 10/1962 | Frevel | 423/564 |
| 3,579,302 | 5/1971 | Sefton | 423/564 |
| 3,752,877 | 8/1973 | Beavon | 423/564 |

FOREIGN PATENTS OR APPLICATIONS

| | | | |
|---|---|---|---|
| 952,555 | 3/1964 | United Kingdom | 423/564 |
| 1,211,033 | 11/1970 | United Kingdom | |

*Primary Examiner*—L. Dewayne Rutledge
*Assistant Examiner*—Michael L. Lewis
*Attorney, Agent, or Firm*—Daniel S. Ortiz

[57] ABSTRACT

The invention is a method for preparing hydrogen sulfide by reacting a gas mixture containing carbon monoxide with sulfur to provide a gas mixture containing carbonyl sulfide and reacting the gas mixture containing carbonyl sulfide with water in the vapor phase to provide a gas mixture containing hydrogen sulfide. The process is preferably operated continuously. The water can be present in the step in which the carbon monoxide is reacted with the sulfur.

10 Claims, 5 Drawing Figures

FIGURE I.

PROCESS FOR PREPARING HYDROGEN SULFIDE

BACKGROUND OF THE INVENTION

Hydrogen sulfide is a by-product in many manufacturing processes. It is produced in processes for refining sulfur-containing petroleum fractions and processes for preparing carbon disulfide by reaction of hydrocarbons and sulfur. In the commercial processes, hydrogen sulfide is a by-product and it is the usual practice to recover the sulfur values from the gas stream by the Claus process or to utilize the hydrogen sulfide in the preparation of sulfuric acid.

In certain industrial processes, hydrogen sulfide is required. It has been known that hydrogen sulfide can be readily prepared by the reaction of hydrogen and sulfur as disclosed in U.S. Pat. No. 2,214,859. In order to make the process commercially feasible, a source of inexpensive hydrogen must be available.

Recently, hydrogen sulfide has taken on a new significance. Hydrogen sulfide has become a valuable industrial material in view of the emphasis placed on processes for removing sulfur dioxide from industrial gaseous effluent streams. One particular advantageous process involves absorbing sulfur dioxide from the effluent in an absorbent and reacting the sulfur dioxide rich absorbent with hydrogen sulfide to form sulfur. The reaction requires two moles of hydrogen sulfide for each mole of sulfur dioxide recovered from the effluent stream.

At locations where it is desirable to abate sulfur dioxide in gaseous emissions, a source of hydrogen sulfide is not always conveniently available.

It is an object of the present invention to provide a process for preparing hydrogen sulfide. It is an object of the present invention to provide a process for preparing hydrogen sulfide from carbonaceous materials which can be utilized to form carbon monoxide. It is a further object of the present invention to provide a process for preparing hydrogen sulfide from gas streams containing carbon monoxide and in addition utilizing any hydrogen present to form additional hydrogen sulfide. An additional object of the invention is to provide a process for preparing hydrogen sulfide from carbon sources such as coal or oil which can be accomplished with low capital and operating costs.

BRIEF SUMMARY OF THE INVENTION

In accordance with the present invention, hydrogen sulfide is prepared from a gas stream containing carbon monoxide by reacting the gas stream containing carbon monoxide with sulfur to provide a gas stream containing carbonyl sulfide and reacting the gas stream containing carbonyl sulfide with water in the vapor phase to provide a gas stream containing hydrogen sulfide. In the process, any hydrogen which is present in the gas, along with the carbon monoxide is also reacted to hydrogen sulfide. The formation of carbonyl sulfide and reaction with water can be carried out sequentially or simultaneously.

The process is particularly advantangeous in that carbonaceous materials such as coal, petroleum coke, coke, activated carbon, heavy oils and the like can be utilized to prepare hydrogen sulfide.

DETAILED DESCRIPTION OF THE INVENTION

Figure 1:
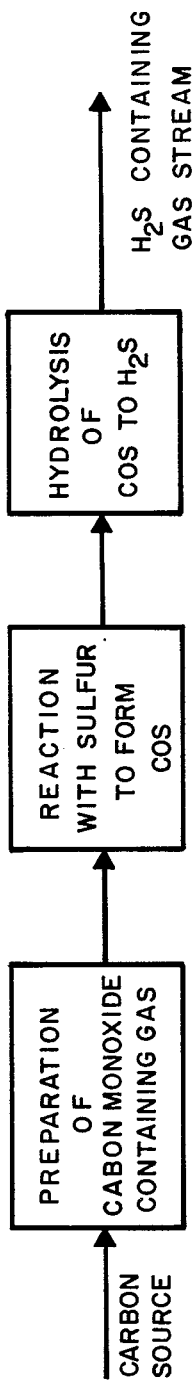
FIG. 1 is a diagrammatic representation of the process.

In general, the process comprises forming a gas stream containing carbon monoxide, reacting the gas stream containing carbon monoxide with sulfur to form carbonyl sulfide and hydrolysis of the carbonyl sulfide to form hydrogen sulfide and carbon dioxide.

The chemistry involved in the process is as follows:

$$2C + O_2 \rightarrow CO$$

$$CO + S \rightarrow COS$$

$$COS + H_2O \rightarrow H_2S + CO_2$$

The reactions occur at moderate temperatures in the presence of a catalyst, or at relatively high temperatures in the absence of a catalyst. The reactions can proceed to substantial completion so that carbon monoxide and carbonyl sulfide are substantially eliminated from the gas mixture.

The reactions are exothermic and can provide sufficient heat to vaporize the sulfur a substantial savings in utility costs for the process. If the initial temperature of the carbon monoxide containing gas stream is sufficiently high the heat generated by the process can be sufficient to vaporize the water required to react with the carbonyl sulfide.

The process is also advantageous in that any hydrogen in the gas stream is converted to hydrogen sulfide, in the step in which carbon monoxide is reacted with sulfur, according to the following reaction:

$$H_2 + S \rightarrow H_2S$$

The process can be operated at from subatmospheric to superatmospheric pressures. However, it is usually preferred to operate the process at from about atmospheric to about four atmospheres pressure.

Processes for preparing carbon monoxide containing gas streams are well known. The Kirk-Othmer *Encyclopedia of Chemical Technology*, 2nd Edition, John Wiley and Sons (1966), Volume 4, pages 438–445, and Volume 10, pages 353–442 describe processes for preparing gas mixtures containing carbon monoxide. The processes involve reaction of an oxygen containing gas such as air, oxygen enriched air or oxygen with a carbon containing material at elevated temperatures or reaction of a carbon containing material with steam at an elevated temperature to provide the carbon monoxide containing gas. In addition to the carbon monoxide, the processes usually provide gas streams containing hydrogen, carbon dioxide, small amounts of methane and nitrogen which usually enters the process with oxygen.

Gas streams containing substantial amounts of carbon monoxide and small amounts of carbon dioxide can be prepared by reacting carbon with oxygen and carbon dioxide at temperatures in a range of about 2,000° to 3,500°F. At the high temperatures, the equilibrium favors the formation of carbon monoxide and gas mixtures containing a substantial portion of carbon monoxide can be provided.

Gas mixtures containing carbon monoxide can also be prepared by the partial oxidation or reforming of hydrocarbons by the action of oxygen or steam at elevated temperatures. The product streams contain carbon monoxide, hydrogen, and small amounts of methane. The Kirk-Othmer reference also describes hydrocarbon partial oxidation and reforming processes. The reforming processes are particularly useful in that the product gas stream contains major portions of carbon monoxide and hydrogen and only minor amounts of inert materials.

Although gas mixtures containing carbon monoxide can be prepared from hydrocarbons, the preferred carbon sources are materials such as activated carbon, petroleum coke and coal. Coal is particularly preferred in that it is readily available at power plants which burn a high sulfur coal and must abate the sulfur dioxide in the effluent gases.

The gas mixture containing carbon monoxide formed by reacting a carbonaceous material with oxygen, air, and/or steam is treated to remove particulate matter and tar like compositions. The tar like compositions can be formed in the gas mixture at the elevated temperature at which the carbon monoxide containing gas mixture is prepared. Treating the gas mixture to remove particulate materials and vaporous impurities is noted as gas conditioning.

Gas conditioning usually requires that the gas mixture be cooled. Waste heat boilers or quenching can be utilized to reduce the temperature of the gas mixture. Particulate matter can be removed from the gas mixture by means such as electrostatic precipitators, cyclones, scrubbers, filters and other means for removing particulate matter from gas mixtures.

The gas mixture containing carbon monoxide is mixed with sulfur liquid or vapor at a temperature of at least about 500°F. and preferably above about 750°F. and passed through a catalytic sulfiding reactor. At about 500°F. the reaction of hydrogen with sulfur is rapid but the reaction of carbon monoxide with sulfur is relatively slow. At temperatures above about 750°F. the reaction of the carbon monoxide with sulfur in the presence of a catalyst is rapid and substantially complete. Catalysts such as iron or promoted iron, activated carbon, molybdenum, cobalt, nickel, silica gel, activated alumina and mixtures thereof, such as molybdenum on activated alumina and mixtures of molybdenum with cobalt or nickel on activated alumina are suitable catalysts for converting carbon monoxide and hydrogen in the gas mixture to carbonyl sulfide and hydrogen sulfide. The metal catalysts are believed to be in the form of the sulfide in the process.

If the gas mixture from the gas conditioning zone is at a temperature below about 500°F., the gas mixture must be heated to a temperature in this range for admixture with sulfur and reaction of the carbon monoxide and hydrogen.

Carbon monixide and sulfur react to form carbonyl sulfide without a catalyst at reaction temperatures above about 1000°F. If the sulfiding reaction is accomplished without a catalyst reaction temperatures preferably between about 1000° and about 1200°F. are utilized.

The gas mixture containing carbon monoxide can be admixed with sulfur in the liquid or vapor form. Care must be taken that the mixture is at a sufficiently high temperature for reaction to occur. Sulfur vapor can be mixed with the gas stream, liquid sulfur can be sprayed into the gas stream or liquid sulfur can be admitted to the catalyst and passed cocurrently or countercurrently to the flow of the gas mixture. An excess of sulfur over that stoichiometrically necessary to react the carbon monoxide to carbonyl sulfide and the hydrogen to hydrogen sulfide is preferably provided to the sulfiding reaction. Excess sulfur insures substantially complete reaction of the carbon monoxide and hydrogen. Less than the stoichiometrically required amount of sulfur can be utilized in the process and results in substantial amounts of carbon monoxide remaining unreacted in the gas mixture.

The reaction is exothermic and if the concentration of carbon monoxide and hydrogen in the gas mixture is sufficiently high sufficient heat is generated to raise the temperature of the gas mixture to the point where rapid reaction occurs. Since heating of the gas mixture to reaction temperature requires heat, the process should be arranged to recover as much heat as possible from the hot gases from the gas forming step, the hot gases from the sulfiding reactor and the hot gases from the hydrolysis reaction. The present invention includes process arrangements for recovering heat from the exothermic process reactions.

Depending on the concentration of carbon monoxide and hydrogen in the gas mixture containing carbon monoxide and the initial temperature, sufficient heat of reaction may be generated to provide the energy to vaporize the sulfur and the water in the process. Heat from external sources may be necessary under conditions where cold dilute carbon monoxide containing gas mixtures are provided.

The gas mixture containing carbonyl sulfide and hydrogen sulfide is then passed to a hydrolysis zone wherein the carbonyl sulfide is reacted with water vapor in the gas phase at a temperature above about 400°F. to convert the carbonyl sulfide to hydrogen sulfide. Any excess sulfur can be removed from the gas stream before the hydrolysis zone.

The hydrolysis reaction is a strongly exothermic reaction. When the inlet gas temperature is in the range of about 400°F., the gas temperature at the outlet of a properly insulated reactor can be in the range of 800° to 1,000°F. The reaction temperature can be moderated by addition of excess steam or the addition of liquid water to the reaction zone. Activated alumina has been found to be an excellent catalyst for the hydrolysis reaction. Other catalysts such as uranium oxide on activated alumina, thoria on pumice chromia on activated alumina, magnesia on pumice, activated charcoal, nickel oxide on activated alumina, and the like, can also be used to catalyze the hydrolysis reaction.

The process can be carried out in a fluid or a static catalyst bed to provide for substantially complete conversion of the carbonyl sulfide to hydrogen sulfide.

The reaction between the carbonyl sulfide and water vapor can be carried out without a catalyst. Relatively high temperatures in the range of above 1000°F. are required.

The reactions are set forth as sequential but can be carried out in one reaction zone by contacting a gas mixture containing carbon monoxide, with sulfur and water at an elevated temperature. The catalysts for the sulfiding reaction can be effective. Relatively high temperatures can promote the reaction in the absence of a catalyst.

The gas stream leaving the hydrolysis zone contains hydrogen sulfide and the carbon dioxide formed from the reaction of carbonyl sulfide and water along with nitrogen, small amounts of CO and COS and other impurities which were present in the gas stream entering the hydrolysis zone.

The gas stream from the hydrolysis zone can be cooled and treated to remove unreacted water and any sulfur which may have been carried through from the sulfiding reaction. The gas stream can also be treated to separate the hydrogen sulfide from the carbon dioxide and other gaseous components if desired.

In a preferred use, the hydrogen sulfide is utilized to react with a sulfur dioxide rich absorbent from a sulfur dioxide abatement process as disclosed in copending U.S. Applications Ser. No. 378,362, filed July 11, 1973, and Ser. No. 295,324, filed Oct. 5, 1972. The process is particularly useful for providing hydrogen sulfide where this material is required and no ready source is available. The process provides a relatively inexpensive method for producing hydrogen sulfide.

The products will be further illustrated by reference to the embodiments as shown in the drawings.

Figure 2:
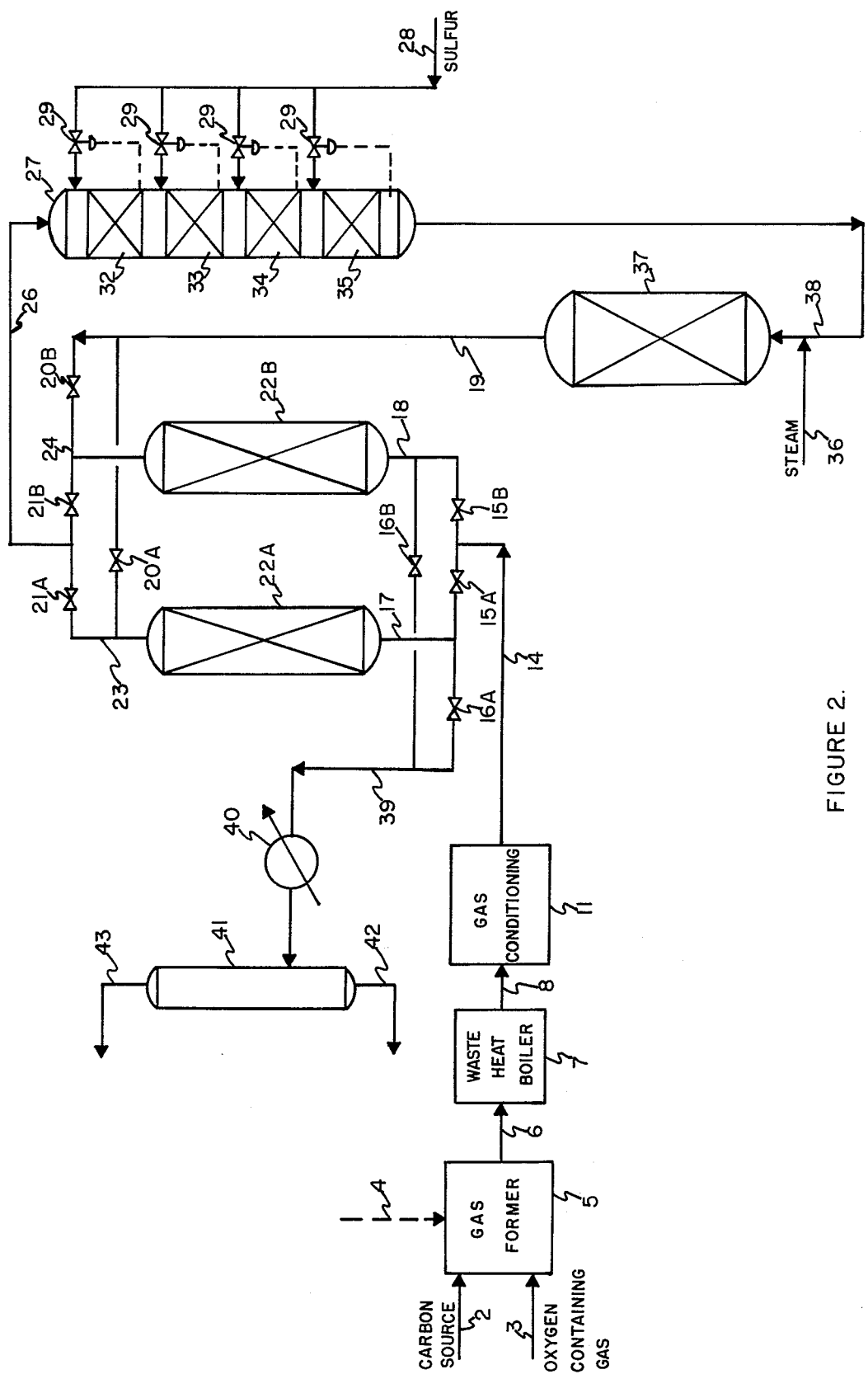
FIG. 2 is a diagrammatic representation of an embodiment of the invention in which regenerative heating is utilized to heat the gas stream to reaction conditions.

FIG. 2 illustrates the process of the invention in which the cold gas mixture containing carbon monoxide is heated to sulfiding temperature by regenerative heating means.

In FIG. 2, the carbon source enters gas former 5 through line 2, the oxygen containing gas which can be air, air enriched with oxygen or oxygen enters gas former through line 3. Steam can enter gas former 5 through line 4 to control the temperature of the gas forming reaction to within the temperature limits of materials of construction of the gas former. The carbon source can be coke or a carbonaceous material such as petroleum coke or coal which contains certain amounts of hydrogen or can be a hydrocarbon material such as methane, or various distillate oils.

In the gas former, the partial combustion of the carbon source with oxygen raises the temperature of the reactants. At the elevated temperature the carbon can further react with steam to form a gas mixture containing carbon monoxide and hydrogen, along with nitrogen which may have entered the gas forming zone with the oxygen containing gas, some carbon dioxide formed by the reaction and small amounts of methane.

The gas mixture at an elevated temperature usually in the range of about 1,000°F. to about 2,500°F. leaves gas former 5 through line 6. A portion of the heat in the gas mixture can be recovered in waste heat boiler 7. The cooled gas mixture leaves waste heat boiler 7 through line 8 and enters gas conditioning zone 11. In gas conditioning zone 11 the gas mixture can be further cooled and particulate impurities can be removed from the gas mixture by electrostatic precipitators, by scrubbers, filters, or other means for separating particulate matter from gas streams. The gas conditioning zone can also be adapted to remove vaporous impurities such as tar from the gas mixture.

The conditioned gas at a relatively low temperature leaves gas conditioning zone 11 through line 14 and is heated by passage through the regenerative heating means.

The gases from gas conditioning zone 11 pass through open valve 15A in line 14 (valve 15B and 16A are in the closed position) and proceed through line 17 to regenerative heater 22A. Regenerative heater 22A contains a packed bed of heat absorbing materials which transfers its heat to the cooled gases passing from gas conditioning zone 11 through the bed of heated material in regenerative heater 22A. The regenerative heater raises the temperature of the gas mixture to above about 550°F. and preferably above about 700°F. The hot gas mixture passes out of regenerative heater 22A through line 23 open valve 21A (valves 21B and 20A remain closed) line 26 and enters sulfiding reactor 27.

In sulfiding reactor 27, the carbon monoxide and any hydrogen present in the gas stream are reacted with sulfur to form carbonyl sulfide and hydrogen sulfide. The reaction of carbon monoxide or hydrogen with sulfur is exothermic and proceeds rapidly when the temperature of the gas sulfur vapor mixture is above about 700°F. The sulfiding reactor 27 contains beds 32, 33, 34 and 35 of a molybdenum cobalt supported on alumina catalyst.

The sulfur enters the sulfiding reactor 27 through line 28 and control valves 29. Sulfur in a finally divided form is admitted to the gas stream above the individual catalyst beds in response to the temperature of the gas stream at the outlet of the catalyst bed. By controlling the admission of sulfur to each catalytic zone, it is possible to provide the heat required to vaporize the sulfur by the heat of reaction of carbon monoxide or hydrogen with sulfur. If sulfur vapor is utilized in the process, it can be admixed with the gas stream at one time or in several stages since the boiling point of sulfur at atmospheric pressure is above the preferred temperature of about 800°F. where the reaction between the carbon monoxide or hydrogen and sulfur proceeds rapidly over the catalyst.

Catalysts such as iron or promoted iron, supported on a suitable carrier, cobalt promoted molybdenum on alumina, nickel or cobalt supported on alumina or silica are suitable catalysts. Catalysts supports such as diatomaceous earth pumice, silica gel, and the like are suitable. The sulfiding reaction takes place at a temperature of between about 500°F. and the temperature at which the particular catalyst is adversely affected by the elevated temperature. That is, temperatures of from about 500°F. to about 1,000°F. are suitable for reacting the carbon monoxide and hydrogen with sulfur to form carbonyl sulfide and hydrogen sulfide in the presence of a preferred catalyst. A preferred catalyst is molybdenum promoted with cobalt on an alumina support. The metals are believed to be in the form of sulfides during the process.

If the sulfiding zone does not contain a catalyst, the mixture of carbon monoxide and sulfur must be heated to about 1000°F. for substantial reaction to occur. The gas and sulfur can be heated separately or the regenerative heaters 22A and 22B can be used to raise the temperature of the gas mixture to reaction conditions.

The hot gas stream contains carbonyl sulfide and hydrogen sulfide, if any hydrogen was present in the gas stream entering the reaction zone, in sulfiding reactor 27.

The gas mixture containing carbonyl sulfide and hydrogen sulfide is admixed with a stoichiometric excess of steam entering line 38 through line 36. The mixture of sulfided gases and steam passes to hydrolysis reactor 37 which contains a bed of activated alumina. The temperature of the gas stream entering the hydrolysis reactor 37 is adjusted to the range of about 400° to 700°F. by adjustment of the gas and steam temperatures.

The hydrolysis reaction is exothermic. Hydrolysis produces a mixture containing hydrogen sulfide and carbon dioxide produced by the reaction of carbonyl sulfide with steam and can contain nitrogen along with small amounts of other impurities. The gas mixture passes out of reactor 37 through line 19. The gas temperature is preferably controlled in the range of 800° to 1,300°F. The gas mixture passes through valve 20B and line 24 to regenerative heating unit 22B (valves 21B and 20A remains closed).

In an alternate embodiment the sulfiding reaction and the hydrolysis reaction can be combined by introducing water into the carbon monoxide, sulfur mixture entering the sulfiding reactor 27. The separate hydrolysis reactor can then be eliminated from the process. The hot gases heat the static bed of material in regenerative heating unit 22B. Materials such as silica, alundum, or magnesia spheres, checker brickwork, crushed refractories and the like can be utilized as packing in the regenerative heating unit. Reduced pressure drops can be obtained if a checker work of high temperature refractories is utilized as the heat absorbing material. The cooled gasses pass out of regenerative heating unit 22B through line 18 and valve 16B (valve 15B and 16A remain closed).

When the temperature of the gas entering sulfiding reactor 27 drops below a predetermined temperature, which may be in the range of 500° to 600°F., depending upon the composition of the gas stream and the catalyst which is utilized, the gas path is changed so that the cold gases pass through regenerative heating unit 22B. The hot gases from the hydrolysis reactor 37 pass through regenerative heating unit 22A to return the unit to a temperature level at which it can heat the carbon monoxide containing gas to sulfiding temperatures.

Cold gases leaving the regenerative heating unit through line 39 pass to heat exchange means 40 which can be a low pressure steam generator wherein the gas stream is cooled to a temperature in the range of 250° to 300°F. Any unreacted sulfur in the gas stream can be separated from the gas stream in coalescer 41 which can be a packed vessel or contain mist eliminating means for coalescing sulfur droplets in the gas stream. Sulfur coalesced in vessel 41 passes out of the system through line 42. The hydrogen sulfide containing gas stream passes out of the coalescer through line 43 and can be further treated or used in a hydrogen sulfide consuming reaction.

The process is particularly advantageous when combined with a process which requires hydrogen sulfide to abate sulfur dioxide containing emissions. The hydrogen sulfide containing gas mixture can be admixed with a liquid absorbent containing sulfur dioxide and reacted with the sulfur dioxide to form sulfur. The sulfur formed can be recycled and utilized in sulfiding reactor 27.

Figure 3:
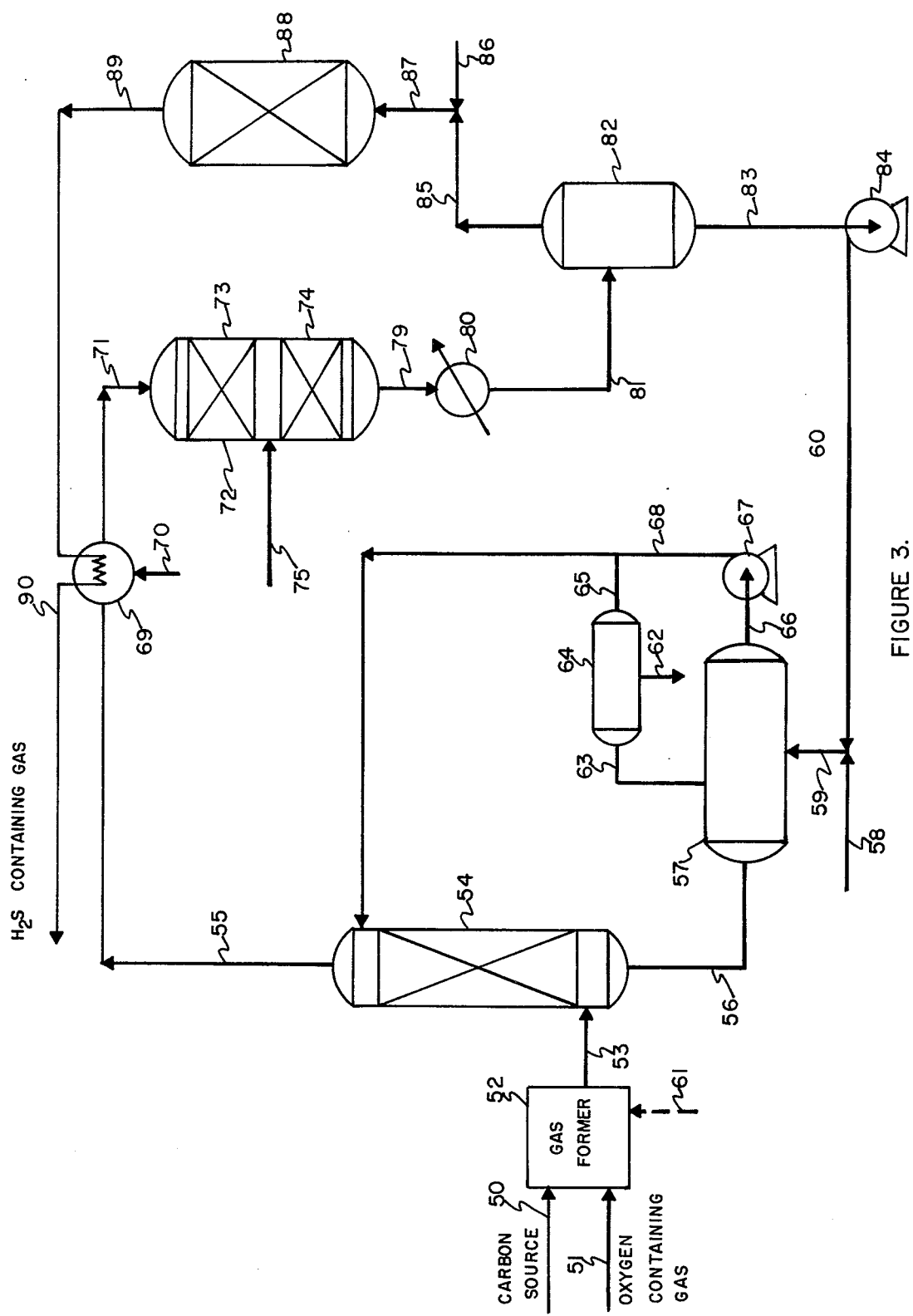
FIG. 3 is a diagrammatic representation of an embodiment of the process of the invention in which the gas from the gas forming apparatus at an elevated temperature is contacted with liquid sulfur to provide a gas stream containing sulfur vapor at an elevated temperature.

FIG. 3 illustrates an embodiment of the process of the invention wherein the hot gas from the gas forming means is scrubbed with liquid sulfur to remove particulate matter and cooled by vaporization of sulfur to provide a gas stream containing sulfur vapor for reaction to carbonyl sulfide and hydrogen sulfide.

The carbon source enters the gas forming means 52 through line 50. The carbon source can be materials such as petroleum coke, coal, natural gas, oil and the like. The carbon source is reacted with oxygen or an oxygen containing gas which enters gas forming means through line 51. Steam can be admitted to the gas forming means 52 through line 61 to control the reaction temperature and to react with carbon to form hydrogen in the gas stream. Gas forming means 52 can also be an externally heated reaction zone operated continuously or cyclically wherein only steam contacts the carbon source during the gas forming reaction. The gas containing carbon monoxide leaves gas forming means 52 at an elevated temperature through line 53.

The hot gas mixture is contacted with liquid sulfur in quench-contacting zone 54. The hot gas mixture can pass through a pool of liquid sulfur in the base of quench-contacting zone 54 and pass countercurrent to liquid sulfur flowing over packing or through shower trays to effectively contact and remove particulate matter from the hot gas mixture. The gas mixture is cooled by contact with the liquid sulfur and a portion of the sulfur vaporizes. If packing is utilized in zone 54, the packing can be impregnated with a catalyst to encourage reaction between the carbon monoxide containing gas stream and sulfur.

The sulfur having contacted the hot gas mixture leaves quench-contacting zone 54 through line 56 and passes to vessel 57. In vessel 57 any light materials which floats to the surface of the sulfur can be removed. Sulfur leaves vessel 57 through line 68. A side stream of sulfur from line 68 can pass through line 65 to solid removal means 64 which can be a filter, liquid cyclone, centrifugal separator or the like and the cleaned sulfur returned to vessel 57 through line 63. Materials separated in separator 64 can be passed out of the system through line 62.

The hot gas mixture leaving zone 54 through line 55 passes to heat exchange means 69 where it can be further heated by indirect heat exchange with the hot gases from hydrolysis reactor 88. In addition liquid sulfur can be injected into heat exchanger 69 to increase the amount of sulfur vapor in the gas mixture passing through line 71 to sulfiding reactor 72. The temperature of the gas stream entering sulfiding reactor 72 is controlled in the range of about 500 to 850°F. Sulfiding reactor 72 contains two static catalyst beds of molybdenum supported on alumina catalyst. Additional sulfur can be introduced into the sulfiding reactor 72 through line 75 if the amount of sulfur vapor in the gas stream entering the reactor is not stoichiometrically sufficient to react all of the carbon monoxide and hydrogen to carbonyl sulfide and hydrogen sulfide. Liquid sulfur can also be introduced into the reactor to maintain the reactor temperature within the desired operating range. As the reaction temperature increases the equilibrium is less favorable for the formation of carbonyl sulfide. At temperatures in the range of 550° to about 750°F. conversion of carbon dioxide to carbonyl sulfide for a feed containing 25% carbon monoxide exceeds 98 percent when the reaction temperature reaches about 1300°F. the conversion of carbon monoxide to carbonyl sulfide is reduced to about 70%. It is therefore desirable to maintain the temperature in the sulfiding reactor at as low a temperature as possible consonant with good reaction kinetics. Sulfur entering the reactor through line 75 should be evenly distributed throughout the gas stream and catalyst. The sulfur can be sprayed in the form of a mist or fine droplets into the gas stream. The gas stream containing the additional sulfur then passes to the second catalyst bed 74 in sulfiding reactor 72 to convert remaining carbon monoxide and hydrogen to carbonyl sulfide and hydrogen sulfide. The catalyst beds can also be of the fluid bed type to aid in heating the incoming gas streams to the reaction temperature. A fluid bed permits lower inlet gas temperatures to be utilized.

The hot gas stream at a temperature in the range of 650° to about 900°F. passes from sulfiding reactor 72 through line 79 and is cooled by heat exchange means 80 to a temperature above the melting point of sulfur and below about 380°F. The cooled gas stream passes through line 81 to sulfur separator 82 where condensed sulfur is separated from the gas stream. The gas stream passes through line 85 is admixed with steam and passes to hydrolysis reactor 88 through line 87. The gas stream entering the hydrolysis reactor should be at a temperature in the range of about 380° to 500°F. to insure rapid hydrolysis of the carbonyl sulfide. The gas stream should be heated to these temperatures if they have been cooled below 380°F. when a static bed is utilized. If a fluid bed reactor is utilized for the hydrolysis the heat in the alumina catalyst can be utilized to bring the reactants up to temperature and lower inlet gas temperatures can be utilized. Hydrolysis reactor 88 contains an activated alumina catalyst in a static or fluid bed.

The reaction between the carbonyl sulfide and water is exothermic and the temprature of the gas leaving hydrolysis reactor 88 through 89 is at a temperature substantially in excess of the inlet temperature. The gas in line 89 is cooled by indirect heat exchange with the inlet gas to sulfiding reactor 72 in heat exchange means 69. The cooled hyrogen sulfide containing gas stream in line 90 can be further treated to remove any sulfur which may be in the gas stream and utilized in a hydrogen sulfide utilization zone.

The embodiment shown in FIG. 3 is particularly useful in that the sensible heat in the feed gas stream containing carbon monoxide is utilized to vaporize sulfur for the sulfiding reaction. The scrubbing zone 54 and sulfiding reactor 72 can be contained in one vessel and further heat economies in the process can be realized.

Figure 4:
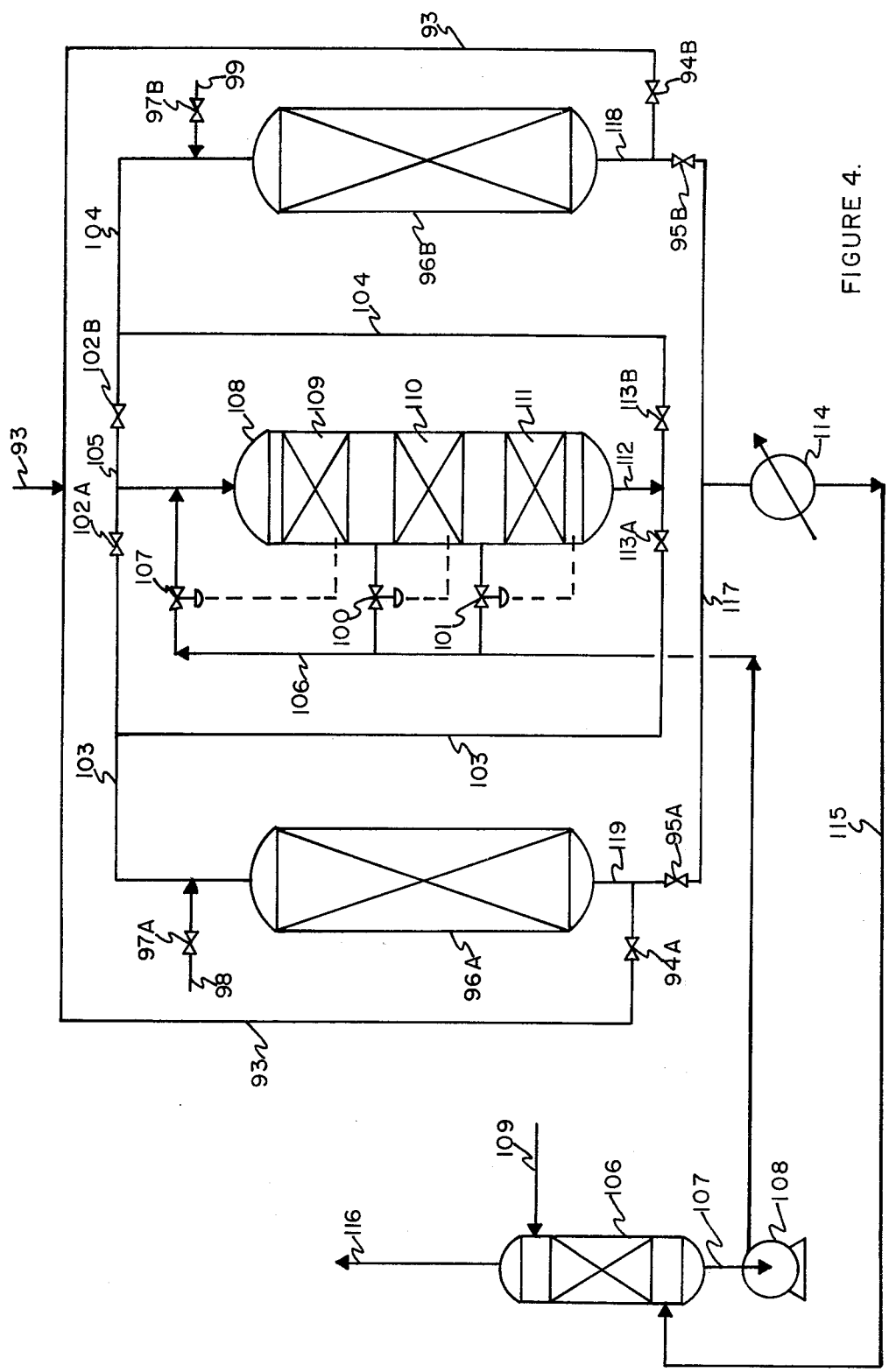
FIG. 4 is a diagrammatic representation of an embodiment of the process wherein the hydrolysis reactors are utilized as regenerative heaters.

FIG. 4 is an embodiment of the process of the present invention wherein the incoming carbon monoxide containing gas stream is regeneratively heated by utilizing the hydrolysis reactor as a regenerative heater. Alternatively, the hydrolysis and sulfiding reactors can be combined. In operation the carbon monoxide containing gas stream enters the process through line 93 and passes through valve 94A to hydrolysis reactor-regenerative heater 96A. Valve 95A and 94B remain closed. The gas stream is heated as it passes upwardly through the activated alumina catalyst bed in hydrolysis reactor 96A. Valve 97A in line 88 is closed and the heated gas stream at a temperature in the range of 550 to about 850°F. proceeds through line 103 and open valve 102A. Valve 102B remains closed.

The heated gas stream is admixed with sulfur in line 105 and proceeds to catalyst bed 104 in sulfiding reactor 108. The amount of sulfur which is admixed with the hot gas stream in line 105 is controlled by valve 107 which is operated to maintain a temperature of between about 750° and 1,000°F. at the outlet of first catalyst bed 109 in sulfiding reactor 108. The gas stream having a portion of the carbon monoxide and hydrogen reacted to carbonyl sulfide and hydrogen sulfide is further admixed with sulfur from line 106 through second control valve 100 which is operated in response to the temperature of the gas stream leaving catalyst bed 110. The temperature of the gas stream at the outlet of catalyst bed 110 is maintained between about 750° and about 1,000°F. by the addition of sulfur through control valve 100 in a finely divided form above catalyst bed 110. Additional sulfur is admitted to the reactor through control valve 101 to maintain a temperature at the outlet of catalyst bed 111 between about 700° and 800°F.

The hot gases leave sulfiding reactor 108 through line 112 and proceed through open valve 113B and line 104 to hydrolysis reactor 96B. Valve 113A and 102B remain closed. Water enters line 104 through line 99 and valve 97B. The water can be in the form of steam or liquid water depending upon the temperature of the gas in line 104. The temperature of the gas stream entering reactor 96B should be between about 350° and about 500°F. The catalyst is preferably in a static bed. The gas stream containing carbonyl sulfide and hydrogen sulfide, if hydrogen was present in the feed gas mixture to the sulfiding reactor, reacts with the water vapor to form additional sulfide and carbon dioxide. The reaction is exothermic and the gas temperature at the outlet of regenerative hydrolysis reactor 96B is between about 800° and about 1300°F. The hot gases pass through line 118 and valve 95B. Valve 94B and 95A remain closed. The hot gases pass through line 117 to heat exchange means 114 which can be a waste heat boiler which supplies steam for the hydrolysis. The gases are cooled to the range of above the melting point of sulfur and about 300°F. The gas stream enters coalescing column 106 where the gas is contacted with a stream of molten sulfur to coalesce and remove sulfur droplets, mist or sulfur vapor from the gas stream. The gas stream containing hydrogen sulfide is removed through line 116 and can be utilized in processes which require hydrogen sulfide. The hydrogen sulfide can be separated from the inert gases if required.

The sulfur from coalescing column 106 is removed through line 107 and pump 108 and is utilized in sulfiding reactor 108 to react with the carbon monoxide and hydrogen to form carbonyl sulfide and hydrogen sulfide. Fresh sulfur enters the process through line 109.

When the outlet temperature of regenerative reactor 96A falls below about 600°F, the inlet gas flow is caused to flow through reactor 96B and reactor 96A is utilized to hydrolyze the carbonyl sulfide formed in sulfiding reactor 108. The feed gas is caused to flow through reactor 96B by closing valves 102A, 94A, 95B and 113B and opening valves 102B, 95A, 113A and 94B. Steam or water is then permitted to enter the process through line 98 and valve 97A while valve 97B is closed.

Figure 5:
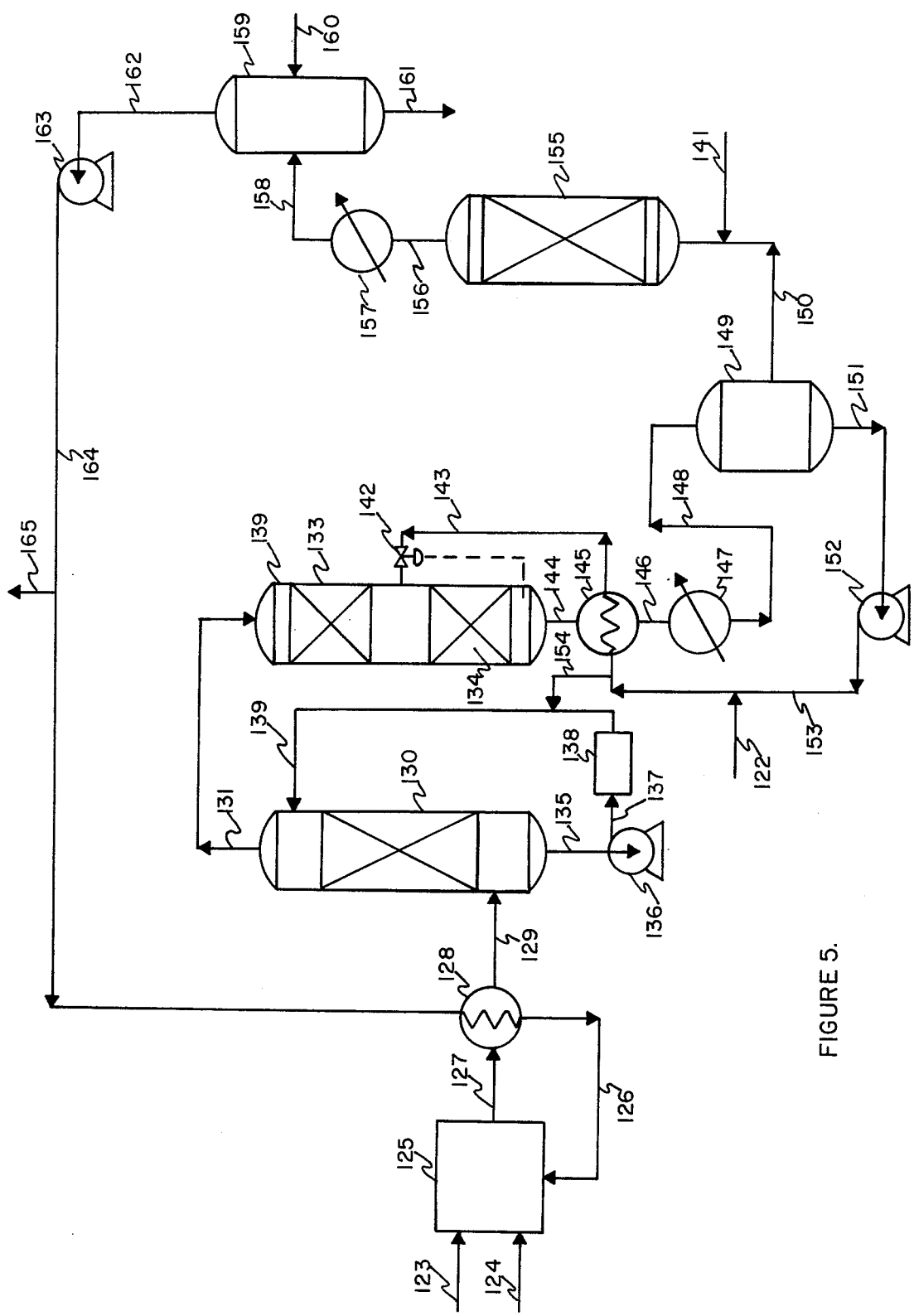
FIG. 5 is a diagrammatic representation of an embodiment of the invention in which a carbonaceous material and oxygen are reacted to form a gas stream comprising carbon monoxide with recycle of at least a portion of the carbon dioxide formed by the hydrolysis to the gas forming step.

FIG. 5 illustrates an embodiment of the process of the invention which is particularly useful when a gas containing a high concentration of oxygen is utilized in the gas forming zone. In the embodiment illustrated in FIG. 5 carbon dioxide is utilized to moderate the heat of reaction in the gas forming zone.

Carbon enters gas forming zone 124 through line 123 and relatively pure oxygen enters the gas forming zone through line 124. Carbon is reacted with the oxygen at a temperature between about 2500° and 3500°F. The reaction temperature is moderated in this range by the addition of a gas containing substantial amounts of carbon dioxide which enters the gas forming zone 125 through line 126. The hot gases from the gas forming zone pass through line 127 and preheat the carbon dioxide entering the gas forming zone by indirect heat exchange in heat exchanger 128. The gas proceeds from heat exchanger 128 through line 129 to quench-contacting means 130 wherein the hot gases are contacted with liquid sulfur. The vaporization of sulfur further reduces the temperature of the gas stream.

The liquid sulfur is circulated through the quench-contacting means by passing through line 135 to pump 136 and line 137 to solid separation means 138 which can be a settling tank, a filter, liquid cyclone and the like. A partially cleaned sulfur stream is recirculated to the quench-contacting means 130 through line 139.

The vapor stream at a temperature in the range of about 550° to about 850°F. passes out of the quench-contacting zone through line 131 to sulfiding reactor 132. A mixture of carbon monoxide and sulfur vapor passes through catalyst bed 133 which can contain silica, alumina, supported metals such as molybdenum, cobalt, nickel, iron or chromium promoted iron. The metal is usually supported on a silica or alumina base and is believed to be in the form of the sulfide during the process. The carbon monoxide and any hydrogen present reacts with the sulfur and the temperature of the gas stream passing out of catalyst bed 133 is increased due to the exothermic heat of the reaction. Additional sulfur enters the reactor through control valve 142 in line 143. The control valve is operated to maintain a temperature at the outlet of catalyst bed 134 at about 750° to 850°F. The hot gas stream passes out of sulfiding reactor 132 through line 144 and is cooled by indirect heat exchange with the sulfur stream entering the reactor. Fresh sulfur enters line 153 through line 122 and a portion of the sulfur is fed to the quench means 130 through line 154 to make up sulfur vaporized into the hot gas stream.

The sulfided gas stream consisting mainly of carbonyl sulfide, carbon dioxide and any inert materials introduced into the process passes out of heat exchanger 145 through line 146 and is further cooled by cooling means 147 which can be a waste heat boiler which supplies the steam utilized in the hydrolysis stage. The gas is cooled in cooling means 147 to a temperature above the melting point of sulfur but below about 300°F.

The cooled gas stream passes through line 148 to coalescing vessel 149 where sulfur which has passed through the process unreacted is separated from the gas stream by means suitable for separating liquids from gases. The condensed and separated sulfur is passed out of coalescing vessel 149 through line 151 to pump 152 for return to the process with the make-up sulfur which enters through line 122. The gas stream passes from coalescing vessel 149 through line 150 and is admixed with steam and passes to hydrolysis reactor 155 containing an activated alumina catalyst. If the catalyst is in a fluid bed a gas temperature above about 250°F. is suitable. If a static bed and adiabatic conditions are utilized an inlet gas temperature in the range of 350° to 400°F. is required. If a static bed jacketed reactor is utilized, recirculation of fluid in the jacket can be used to preheat the inlet gas and an inlet gas temperature in the range of 250°F. can be suitable.

The steam and the carbonyl sulfide react to form hydrogen sulfide over the activated alumina catalyst in hydrolyzing zone 155. Excess steam can be added to the gas stream to moderate the temperature so that the maximum temperature does not exceed the range of about 1,000° to 1,200°F. The hot gas stream leaves the hydrolysis reactor 155 through line 156 and is cooled by heat exchanger 157 which can be a waste heat boiler to substantially recover the exothermic heat of the reaction to provide steam to the process. Sulfur can be separated from the gas stream and the gas stream further cooled by heat exchange with water in a heat exchanger not shown and passed through line 158 to hydrogen sulfide reactor 159.

In reactor 159 the hydrogen sulfide is reacted with a sulfur dioxide rich phosphate or citrate absorbent at a pH between about 2.5 and about 5 to form sulfur and a gas stream containing small amounts of hydrogen sulfide and the carbon dioxide formed by the hydrolysis of carbonyl sulfide. The regenerated absorbent containing precipitated sulfur leaves reactor 159 through line 161 and can be treated to separate the sulfur formed and returned to absorb additional sulfur dioxide. The gas stream containing small amounts of hydrogen sulfide and carbon dioxide is passed out of reaction zone 159 through line 162 to compressor 163 where the pressure of the gas stream is increased. The gas stream flows through line 164 to heat exchanger 128 where it is preheated before entering the gas forming zone. A portion of the gas stream is vented from the system through line 165.

As can be seen from the illustrative embodiments of the process, hydrogen sulfide can be readily prepared from a carbon source which may contain hydrogen without expenditure of large amounts of additional energy for reheating the gas streams and vaporizing sulfur.

The reaction of carbon monoxide and hydrogen with sulfur to form carbonyl sulfide and hydrogen sulfide can substantially eliminate carbon monoxide from the gas stream. The hydrolysis of the gas mixture containing carbonyl sulfide can substantially eliminate carbonyl sulfide from the gas mixture. The reaction of carbon monoxide with sulfur to form carbonyl sulfide and the reaction of carbonyl sulfide with water will be illustrated by the reference to the following examples.

EXAMPLE 1

Reaction $CO + S \rightarrow COS$

An 18 inch piece of 1½ inch schedule 40 stainless steel pipe was wrapped with heating tape and insulated. A 10 inch deep bed of a ⅛ inch diameter extruded catalyst C20-6-01 manufactured by Catalyst and Chemicals Corp., Louisville, Kentucky, was placed in the central portion of the vertically supported pipe. The catalyst specification was as follows:

| CoO | – | 3.3 | – | 3.8 |
| MoO$_3$ | – | 13 | – | 15% |
| Alumina support | | | | |
| Surface Area 150–250 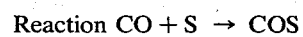 | | | | |

Synthetic gas mixtures where prepared by continuously mixing gas streams metered through rotometers. The gas mixtures were heated in the conduit leading to the reactor. The gas mixtures entered the reactor below the catalyst bed and passed upwardly through the bed.

The gas flow rates were 6.35 ft.$^3$/hour and provided a space velocity of 600 Hr.$^{-1}$ and a contact time of 2.5 sec. at 750°F.

Molten sulfur from a nitrogen pressurized reservoir was fed dropwise onto the top of the catalyst bed at a temperature of 300°F. Excess sulfur which flowed through the catalyst bed was removed from the bottom of the reactor. Large excesses of sulfur (50–200% excess) were introduced into the catalyst bed. The gas temperature was measured below and above the catalyst bed.

The reacted gas mixture was cooled, separated from unreacted sulfur, sampled and analyzed by gas chromatography.

TABLE I

| Feed Composition Mole Percent | | | Temperature °F. | | Conversion (CO+H$_2$) Percent | Percent CO in Product Gas |
|---|---|---|---|---|---|---|
| H$_2$ | CO | N$_2$ | Below Bed | Above Bed | | |
| 0 | 25 | 75 | 810 | 580 | 95–100 | 0.2 |
| 15 | 25 | 60 | 800 | 600 | 90 | 4.0 |
| 15 | 25 | 60 | 730 | 585 | 80 | 7.7 |
| 15 | 25 | 60 | 545 | 530 | 54 | 15.7 |

The data indicates that carbon monoxide and hydrogen can be reacted with sulfur over a broad temperature range to provide a gas mixture containing COS.

EXAMPLE 2

Hydrolysis of COS $$COS + H_2O \rightarrow H_2S + H_2O$$

A mixture of COS and a stoichiometric excess of water vapor were passed over an activated alumina catalyst. The alumina catalyst had the following characteristics

| Particle Size | ¼ inch spheres |
|---|---|
| Bulk Density | 51 pounds/cubic foot |
| Void Fraction (Percent) | 40.9 |
| Surface Area | $\dfrac{\text{(Square meter)}}{\text{gram}}$ 390 |

| Composition | Percent |
|---|---|
| Al$_2$O$_3$ | 90 |
| Na$_2$O | 2.0 |
| SiO$_2$ | 0.05 |

| Composition | Percent |
|---|---|
| Fe$_2$O$_3$ | 2.00 |
| TiO$_2$ | 0.001 |
| Loss on Ignition (1100°C.) | 6.0 |

The catalyst bed was 30 inches deep in a 2 inch I.D. electrically heated and insulated reactor.

The inlet gas temperature and bed temperature were measured during the run. The electrical heaters were adjusted to maintain a slightly lower wall temperature than the temperature indicated in the center of the bed.

TABLE 2

| Run | Feed Temp. °F. | Maximum Temp. in catalyst Bed °F. | Space Velocity Hour$^{-1}$ | Residence Time Seconds | Excess H$_2$O Volume Percent | Percent Conversion |
|---|---|---|---|---|---|---|
| 1 | 690 | 936 | 5100 | 0.43 | 40.7 | 98.9 |
| 2 | 680 | 965 | 5100 | 0.43 | 42.8 | 99 |
| 3 | 690 | 940 | 5000 | 0.43 | 47.5 | 99.3 |

The data in Table 2 indicates that carbonyl sulfide can be rapidly reacted with water vapor to produce hydrogen sulfide at relatively low temperatures and that carbonyl sulfide can be substantially eliminated from the reactor effluent gas.

What is claimed is:

1. A process for preparing hydrogen sulfide which comprises:

a. providing a gas mixture containing carbon monoxide;

b. heating said gas mixture to a temperature above about 500°F. by direct heat exchange with a heated material whereby the heated material is cooled in a first zone;

c. introducing sulfur into the gas mixture and reacting the gas mixture with the sulfur at a temperature between about 500° and 1300°F. to form a gas mixture containing carbonyl sulfide in a second zone;

d. reacting the gas mixture containing carbonyl sulfide with water, in the vapor phase, at a temperature between about 400°F. and about 1300°F. to form a reacted gas mixture containing hydrogen sulfide in a third zone; and e. cooling said reacted gas mixture by direct heat exchange with a cooled material whereby said cooled material is heated to be used as the heated material in said first zone.

2. The process of claim 1 wherein water is present when the gas mixture containing carbon monoxide is reacted with sulfur.

3. The process of claim 2 wherein the cooled material is a catalyst for the reaction of carbon monoxide with sulfur and of carbonyl sulfide with water and steps (c), (d) and (e) are carried out simultaneously.

4. The process of claim 1 wherein the cooled material is a catalyst for the reaction of carbonyl sulfide with water and steps (d) and (e) are carried out simultaneously.

5. The process of claim 1 wherein sulfur is introduced into the gas mixture containing carbon monoxide before the gas mixture is contacted with the heated material.

6. The process of claim 1 wherein the gas mixture contains hydrogen.

7. In a process for the preparation of hydrogen sulfide wherein a gas mixture containing carbon monoxide and sulfur is reacted to form carbonyl sulfide and the carbonyl sulfide is reacted with water in the vapor phase to form hydrogen sulfide, the improvement which comprises contacting a hot gas mixture containing carbon monoxide with liquid sulfur whereby the gas mixture is cooled to a temperature above about 500°F. and at least a portion of the sulfur is vaporized whereby a gas mixture containing sulfur is formed and said carbonyl sulfide is reacted with water at a temperature from about 400°F to about 1300°F.

8. The method of claim 7 wherein the gas mixture contains hydrogen.

9. The method of claim 7 wherein only a portion of the sulfur is vaporized and whereby the gas mixture is scrubbed by the liquid sulfur and particulate matter is removed from the gas mixture.

10. The process of claim 7 wherein the gas mixture containing carbon monoxide and sulfur is reacted at a temperature from about 500° to about 1200°F.

* * * * *